US007026777B2

(12) United States Patent
Matsui et al.

(10) Patent No.: US 7,026,777 B2
(45) Date of Patent: Apr. 11, 2006

(54) VEHICLE DOOR DRIVING SYSTEM

(75) Inventors: Seika Matsui, Chiryu (JP); Yoshinori Iwase, Chiryu (JP); Takeshi Yamamoto, Takahama (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/951,882

(22) Filed: Sep. 29, 2004

(65) Prior Publication Data

US 2005/0067990 A1 Mar. 31, 2005

(30) Foreign Application Priority Data

Sep. 29, 2003 (JP) ............................ 2003-337886

(51) Int. Cl.
*G05B 5/00* (2006.01)

(52) U.S. Cl. ....................... 318/478; 318/445; 318/443

(58) Field of Classification Search .................. 49/360, 49/503; 296/155; 318/478, 445, 443
See application file for complete search history.

(56) References Cited

U.S. PATENT DOCUMENTS

| | | | |
|---|---|---|---|
| 6,256,932 | B1 * | 7/2001 | Jyawook et al. .............. 49/503 |
| 6,435,600 | B1 * | 8/2002 | Long et al. ................. 296/155 |
| 6,701,671 | B1 * | 3/2004 | Fukumoto et al. ............ 49/280 |
| 2001/0033086 | A1 | 10/2001 | Yuge et al. |
| 2002/0084668 | A1 | 7/2002 | Yamagishi et al. |
| 2002/0088180 | A1 * | 7/2002 | Yokomori ...................... 49/31 |
| 2002/0180237 | A1 * | 12/2002 | Rogers et al. .............. 296/155 |
| 2004/0123525 | A1 * | 7/2004 | Suzuki et al. ................. 49/360 |

* cited by examiner

*Primary Examiner*—Karen Masih
(74) *Attorney, Agent, or Firm*—Buchanan Ingersoll PC

(57) ABSTRACT

A vehicle door driving system includes a driving power source for generating a driving force, a clutch mechanism adjusted to be engaged and disengaged, and controlling means for controlling the clutch mechanism to be engaged and disengaged, the controlling means controlling the driving power source to generate the driving force. The controlling means judges whether the vehicle is at a vehicle driving recognition state, and the controlling means controls the clutch mechanism to be engaged when the controlling means identifies the vehicle driving recognition state.

17 Claims, 7 Drawing Sheets

VEHICLE DOOR DRIVING SYSTEM

CROSS REFERENCE TO RELATED APPLICATIONS

This application is based on and claims priority under 35 U.S.C. §119 with respect to a Japanese Patent Application 2003-337886, filed on Sep. 29, 2003, the entire content of which is incorporated herein by reference.

FIELD OF THE INVENTION

This invention generally relates to a vehicle door driving system for opening and closing a vehicle door. More particularly, this invention pertains to a vehicle door driving system capable of preventing noise occurrence due to vibration upon vehicle driving and so a comfortable vehicle inside space is achieved.

BACKGROUND

In an automobile industrial field, somewhat recent requirements have led to a vehicle inside space, which provide comfortable feeling to occupants. In order to meet these recent requirements, a recent vehicle is provided with various types of devices that help to achieve the comfortability. The vehicle door driving system is employed so as to automatically operate a vehicle door such as a power sliding door, a power back door and a power luggage door. A driving force of a driving power source such as a motor achieves an automatic opening and closing operation of the vehicle door in response to a simple and easy operation by a user, e.g., in response to a switch operation.

This type of vehicle door can be automatically opened and closed from a vehicle inside. Especially for children and elderly people, this type of vehicle door driving system offers gratification in opening and closing the vehicle door with less human power and easy operation. On the other hand, the automatic operation of the vehicle door may become disabled due to unanticipated occurrences such as a failure of the vehicle door driving system. When encountering this sort of unanticipated occurrence, the user tends to open or close the vehicle door manually. However, relatively large mechanical friction between the vehicle door and the driving power source may disable the vehicle door opening and closing operation. Further, the relatively large mechanical friction may makes the vehicle door opening and closing difficult.

From a different point of view, the vehicle door manual operation may be required for other reasons, which are different from the unanticipated occurrences such as the system failure. In light of foregoing, recent requirements have further lead to a vehicle door operation system, which can switch a vehicle door manual operation and a vehicle door automatic operation.

JP2001-277853A2, which corresponds to US2001/0033086A1, discloses an operating device for an automotive pivotal door. The operating device is provided with an electromagnetic clutch interposed between a driving power source and a vehicle door. The electromagnetic clutch, which is engaged and disengaged, establishes and interrupts a transmission path of a driving force from a driving power source to a vehicle door. Therefore, the operation device enables an automatic opening and closing operation of the vehicle door and also a manual opening and closing operation thereof, depending upon situations.

As described above, while a vehicle is provided with various types of functions and a vehicle quality itself has improved, a further requirement has been lead to a comfortable vehicle inside. In order to meet the requirement, noise occurrence due to vibration upon the vehicle driving is required to be reduced.

For example, in the operating device disclosed in JP2001-277853A2, a member such as a rubber-made sealing member is interposed between a vehicle body and a vehicle door, so as to prevent noise occurrence upon the vehicle driving. However, there may be a case that unpleasant noise may occur due to gear rotation via a ring. Further, while the vehicle has moved, a vehicle door operating device has been normally interrupts the clutch engagement. Therefore, a space between the driving power source and the vehicle door has been under a free condition, at which any restrain is applied. In this case, noise may occur due to a mechanical play between each gear in the operating device or a displacement therebetween. Although it is difficult to reduce these noises, the comfortable vehicle inside space may be interrupted due to the noises. In light of foregoing, these noises have been required to be reduced as much as possible so that sense of serenity in the vehicle can be improved.

A component such as a vibration-absorbing member can be attached at each component in a vehicle door operation-controlling device. Adding a new component to a conventional device, which has a limited inside space for attaching a component, is difficult. If a component is forced to be additionally provided at the device, the vehicle inside space may be constrained. Further, an additional component may lead to increase of a manufacturing cost. In light of foregoing, it may not be preferable.

A need exists for providing a vehicle door driving system capable of preventing noise occurrence due to vibration during vehicle driving without any additional component, thereby enabling to achieve a more comfortable vehicle inside.

SUMMARY OF THE INVENTION

According to an aspect of the present invention, a vehicle door driving system includes a driving power source for generating a driving force, a clutch mechanism adjusted to be engaged and disengaged, and controlling means for controlling the clutch mechanism to be engaged and disengaged, the controlling means controlling the driving power source to generate the driving force. The controlling means judges whether the vehicle is at a vehicle driving recognition stale, and the controlling means controls the clutch mechanism to be engaged when the controlling means identifies the vehicle driving recognition state.

According to another aspect of the present invention, a vehicle door driving system includes a driving power source for generating a driving force, a clutch mechanism to be engaged and disengaged, and controlling means for controlling the clutch mechanism to be engaged and disengaged, the controlling means controlling the driving power source to generate the driving force. The controlling means judges whether the vehicle door is at an open or closed condition, and the controlling means controls the clutch mechanism to be engaged when the controlling means identifies a vehicle door at the closed condition.

According to still further aspect of the present invention, a vehicle door apparatus includes a driving power source, a clutch mechanism adjusted to be engaged and disengaged, a controller for controlling the clutch mechanism to be engaged and disengaged, the controller controlling the driving power source to generate the driving force. The controller controls opening and closing a vehicle door by activating the driving power source during the clutch mechanism being engaged when the vehicle door is opened and closed in response to an instruction of a user, the controller engages the clutch mechanism by identifying a timing when the vehicle door is not opened and closed by the user, and the controller disengages the clutch mechanism by identifying a timing when the vehicle door is opened and closed by the user.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Embodiments of the present invention will be described hereinbelow in detail with reference to the accompanying drawings.

Figure 1:
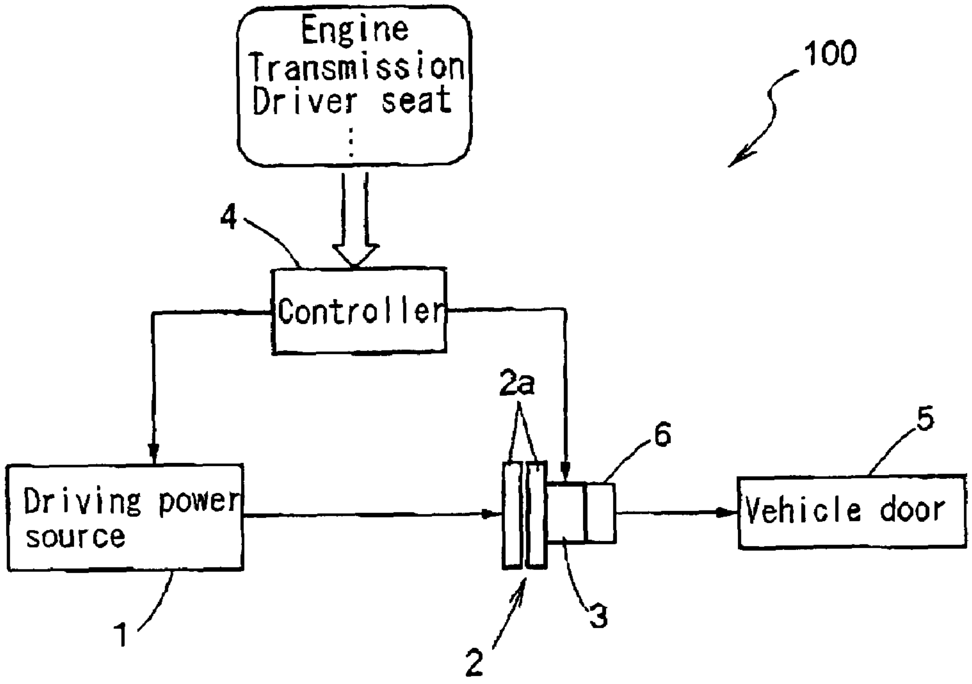
FIG. 1 is a pattern diagram illustrating a vehicle door driving system according to a first embodiment of the present invention.

As illustrated in FIG. 1, a vehicle door driving system 100 according to a first embodiment of the present invention is provided with a driving power source 1, a clutch 2, a switching means 3 for switching the clutch 2 between a clutch engagement condition and a clutch disengagement condition. The driving power source 1 can be an electric motor as a non-limiting example. When the clutch 2 is engaged, the clutch 2 can transmit a driving power from the driving power source 1. The clutch 2 can be an electromagnetic clutch as a non-limiting example. The switching means 3 can be an on/off switch commonly used as a non-limiting example The switching means 3 applies a pushing force to a clutch plate 2*a* of the clutch 2 and stops it in response to the switch on and off operation. In this manner, the clutch 2 is engaged and disengaged by the switching means 3. The clutch 2 and the switching means 3 configure a clutch mechanism adjusted to be engaged and disengaged. The clutch mechanism enables to establish and interrupt a path for transmitting the driving force from the driving power source 1 to the vehicle door 5.

The vehicle door driving system 100 is further provided with a controller 4 (i.e., controlling means) for controlling each unit. The controlling means 4 can identify a vehicle driving recognition state. Hereinafter, the vehicle driving recognition state includes a state where the vehicle has actually run or moved, and further includes a state where the vehicle can run or move. For example as the state where the vehicle can run or move, there are a state where the vehicle has been stationary with an engine being activated, a state where a Shift lever linked to a transmission has been positioned at a P (parking) or N (neutral) range, a state where an occupant has been seated at a driver seat or a state where the vehicle has been stationary with an engine being activated and a brake pedal not being operated.

According to the first embodiment of the present invention, the controlling means 4 can control the switching means 3 based upon the above-described vehicle driving recognition state. When the controlling means 4 identifies the vehicle driving recognition state, the controlling means 4 sends a command signal for engaging the clutch 2 to the switching means 3. The switching means 3 receives the command signal and engages the clutch 2. In response to the clutch engagement while the vehicle has been at the driving recognition state, a locked condition is established between the driving power source 1 and the vehicle door 5. Therefore, impacts between each component due to a vehicle vibration can be reduced, thereby enabling to prevent noise occurrence. Further, as far as the locked condition can be established as aforementioned, there is no need to additionally provide a component such as a vibration-absorbing member at the vehicle door driving system 100. Therefore, noise occurrence can be effectively avoided while a manufacturing cost of the system can be prevented from being increased.

It is preferable that the controlling means 4 sends a command signal to the driving power source 1 so as to generate a predetermined driving force, and the predetermined driving force is transmitted from the driving power source 1 to a vehicle door 5. Hereinafter, the predetermined driving force can possess such a small force at which the vehicle door 5 is not operated. The predetermined driving force can be generated for a short period of time. Since the predetermined driving force is sufficiently small, the vehicle door 5 is not opened in error while the vehicle has run.

If the predetermined driving force is transmitted from the driving power source 1 to the vehicle door 5 while the vehicle has been at the vehicle driving recognition state with the clutch 2 being engaged, a play, e.g., a gear backlash, at a mechanically connected portion between the driving power source 1 and the vehicle door 5 can be taken away. Comparing with a condition where the clutch 2 has been at the engaged condition without the predetermined driving force generated, the movement between each component is more restrained, thereby more effectively enabling to prevent noise occurrence due to the vehicle vibration.

This predetermined driving force can be applied in a direction for opening the vehicle door 5 and in a direction for closing the vehicle door 5. It is preferable that the predetermined driving force is applied in the direction for closing the vehicle door 5, an entire area of the vehicle door 5 can be more stably controlled, and further displacements between each part can be more reliably reduced.

It is sufficient that the predetermined driving force is applied to the vehicle door 5 at least one time. Further, it is preferable that the driving power source 1 is stopped from being electrically excited after applying the driving force to the vehicle door, thereby enabling to prevent an unnecessary consumption of a battery power. For example, when a worm gear is interposed between the driving power source 1 and the vehicle door 5, the worm gear does not return even if the driving power source 1 stops after applying the predetermined driving power source to the vehicle door 5. Therefore, the mechanically connected portion between the driving power source 1 and the vehicle door 5 can be effectively maintained at the engaged condition without the play between each part or with the reduced play therebetween, wherein the noise due to the vehicle vibration can be prevented from occurring.

According to the first embodiment of the present invention, the vehicle door driving system 100 can be further provided with an engagement force adjusting means 6 for adjusting an engagement force for engaging the clutch 2. Especially, when the electromagnetic clutch is applied to the clutch 2, heat generation at the clutch 2 due to electric current supplied thereto becomes sometimes an issue. For example, when the engagement force adjusting means 6 is provided at the vehicle door driving system 100, the amount of electric current to be supplied to the clutch 2 can be reduced down to the minimum electric current amount by performing a PWM (pulse width modulation) control. The minimum electric current amount can be defined at approximately 20 percents of the maximum electric current amount, for example. As described above, the engagement force adjusting means 6 can effectively prevent the failure of the vehicle door driving system 100 before happens, thereby enabling to improve durability of the clutch 2.

In more detail, a relatively large driving power is required to operate the vehicle door 5, especially to lift up the vehicle door 5. In this case, the clutch 2 is required to be engaged at a relatively large engagement force. However, the predetermined driving force for taking away the play at the mechanically connected portion between the driving power source 1 and the vehicle door 5 is not designed at such large driving force and is designed at a driving force not to operate the vehicle door 5. Therefore, the engagement force adjusting means 6 identifies the purpose of the clutch engagement in response to the information from the controlling means 4. The purpose of the clutch engagement includes the vehicle door operation and the reduction of the mechanical play. The engagement force for engaging the clutch 2 is adjusted by the engagement force adjusting means 6 and the switching means 3, thereby enabling to prevent overheating of the clutch 2.

Figure 3:
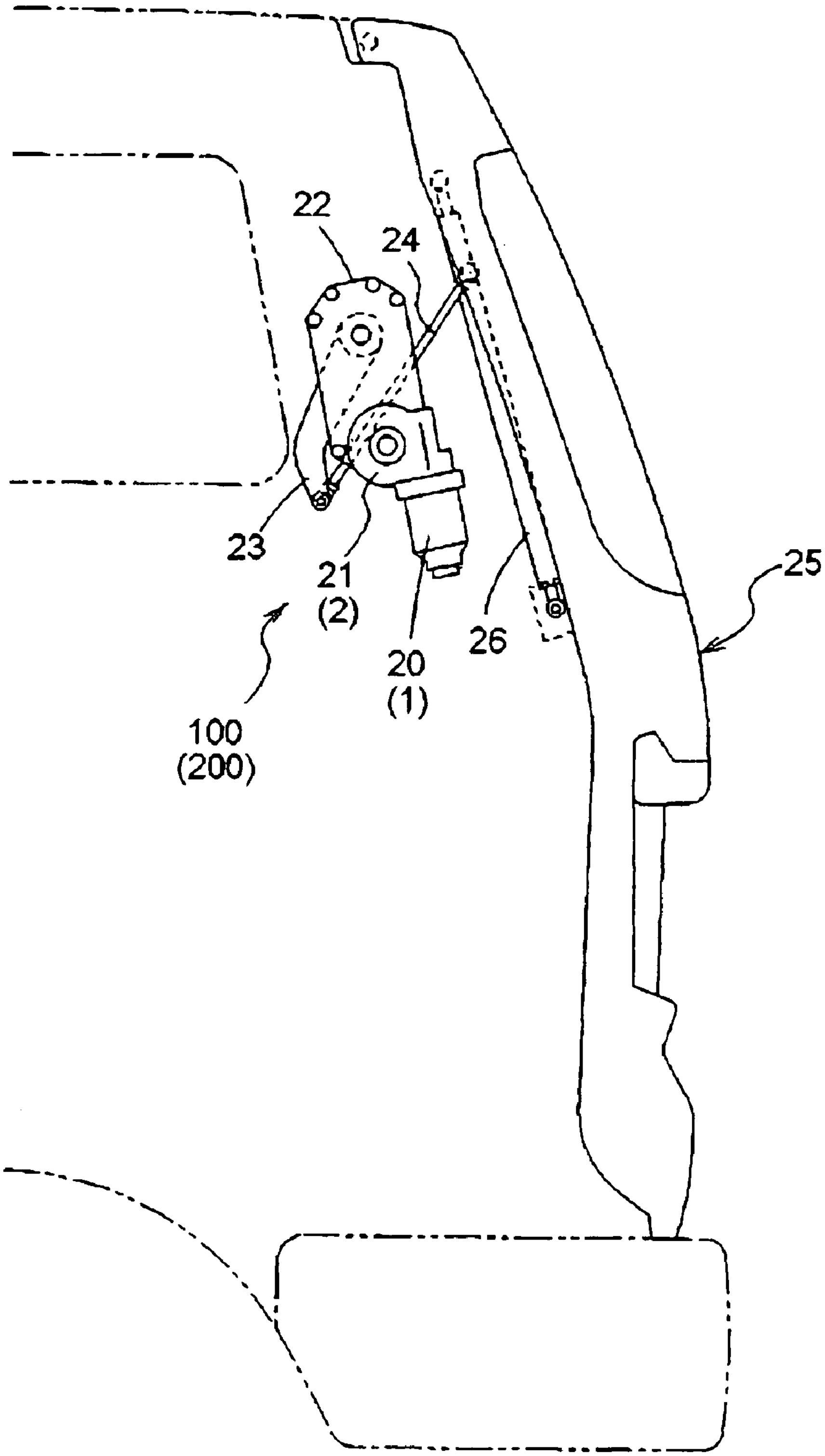
FIG. 3 is a view illustrating an example of the vehicle door driving system actually mounted at a vehicle rear door.
Figure 4:
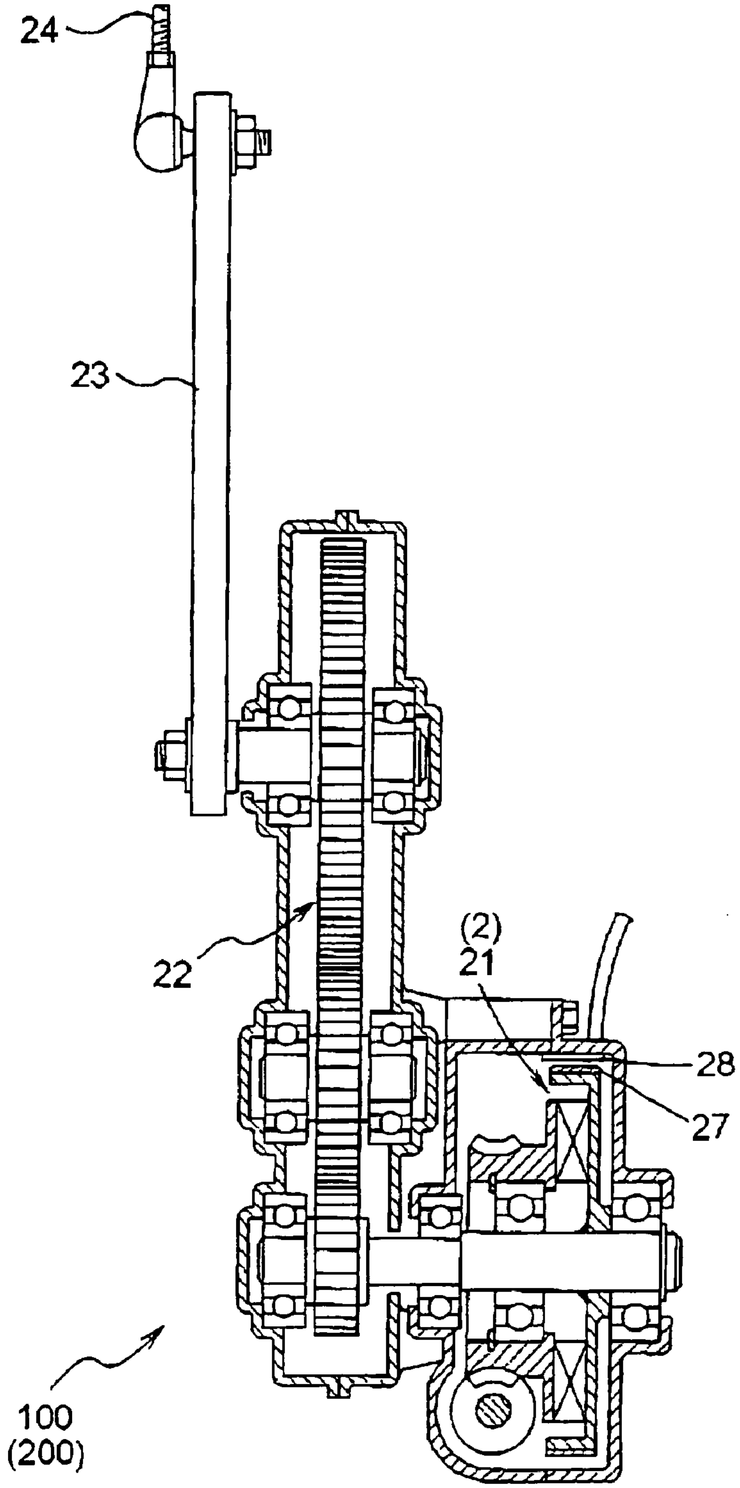
FIG. 4 is a detail view illustrating the vehicle door driving system.

Next, following explanation will be given for explaining a structure of the vehicle door driving system 100 actually mounted at a vehicle rear door with reference to FIGS. 3 and 4.

The vehicle door driving system 100 employs an electric motor 20 as the driving power source 1, and an electromagnetic clutch 21 as the clutch 2. The switching means 3, the controlling means 4 and the engagement force adjusting means 6 are included in a not-illustrated vehicle-mounted computer. An input side of the electromagnetic clutch 21 is connected to the electric motor 20, while an output side thereof is connected to a speed reduction mechanism 22. The speed reduction mechanism 22 is linked to an arm 23. The arm 23 pivotally pushes and pulls a rear door 25 via a rod 24, wherein the rear door 25 is automatically opened and closed. As illustrated in FIG. 4, at least a magnet 27 having different polarities are fixedly attached at outer peripheral portions of the electromagnetic clutch 21 in a circumferential direction thereof. At least a Hall IC 28 is positioned at stationary places facing the plural magnets 27. The Hall IC 28 outputs a rectangular wave in response to the pivotal movement of the arm 23 for opening and closing the Tear door 25. The not-illustrated vehicle-mounted computer computes the rectangular wave so that the movement amount of the arm 23 can be detected. The pivotal moving speed of the arm 23 can be detected by measuring the number of pulses, i.e. by measuring a length of a pulse. The information such as the pivotal movement amount of the arm 23 and the pivotal moving speed thereof can be referred to by the controlling means 4 in order to perform various controls.

Next, following explanation will be given for explaining a method of operating the vehicle door driving system 100 according to the first embodiment of the present invention with reference to FIGS. 5 and 6. The flowcharts in FIGS. 5 and 6 explain programs for preventing the noise occurrence or for reducing the noise, respectively.

Figure 5:
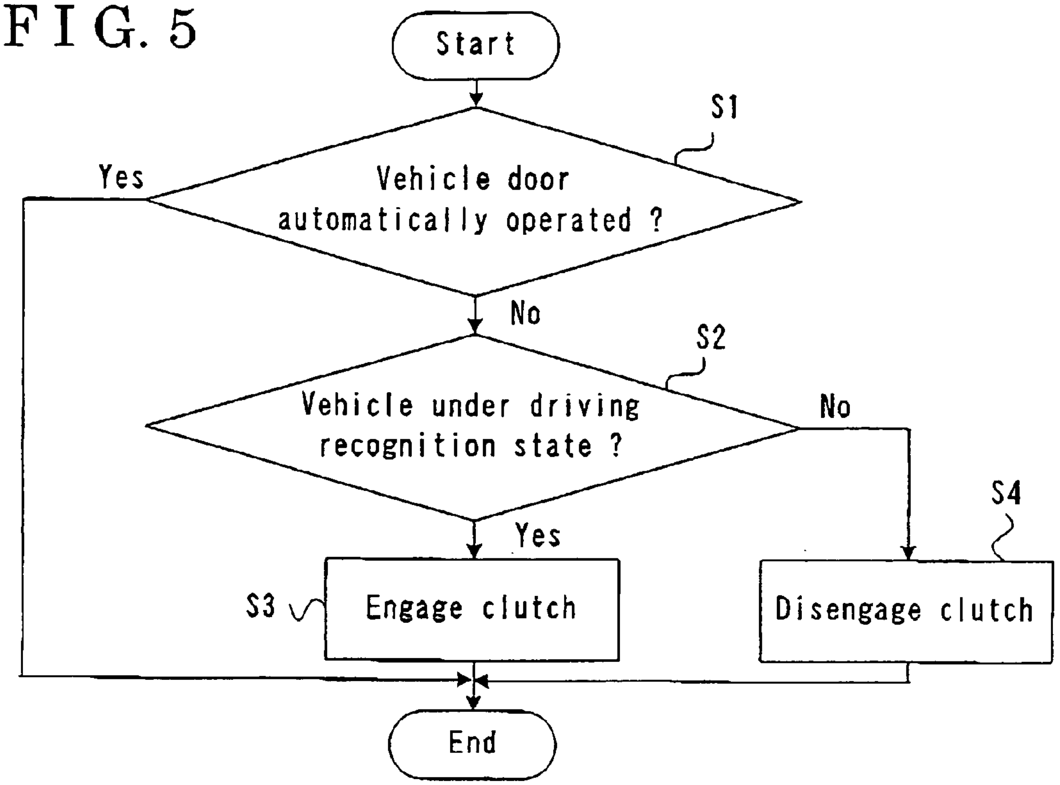
FIG. 5 is a flowchart for explaining a sequence of operating the vehicle door driving system illustrated in FIG. 1.

As explained in FIG. 5, the controlling means 4 judges at step S1 whether the vehicle door 5 has been automatically operated. When an affirmative answer YES is obtained at step S1, i.e., when the vehicle door 5 is judged to have been automatically operated, the program is ended without operating the driving power source 1, the clutch 2 and the engagement force adjusting means 6 for the purpose of the noise reduction. On the other hand, when a negative answer NO is obtained at step S1, i.e., when the vehicle door 5 is judged to have not been automatically operated, the program proceeds to step S2, wherein the controlling means 4 judges whether the vehicle has been at the vehicle driving recognition state. When an affirmative answer YES is obtained at step S2, i.e., when the vehicle is judged to have been at the vehicle driving recognition state, the program proceeds to step S3. At step S3, the clutch 2 is engaged. The program is then ended. When a negative answer is obtained at step S2, i.e., when the vehicle is judged to have not been at the vehicle driving recognition state, the program proceeds to step S4, wherein the clutch 2 is disengaged. The program is then ended. The process for engaging the clutch 2 at step S3 can includes a process for adjusting the engagement force for engaging the clutch 2. In this case, heat generation at the clutch 2 due to the electric supply to the clutch 2 can be restrained. Therefore, it is possible to prevent a failure of the vehicle door driving system 100 before happens, thereby enabling to improve durability of the clutch 2.

Figure 6:
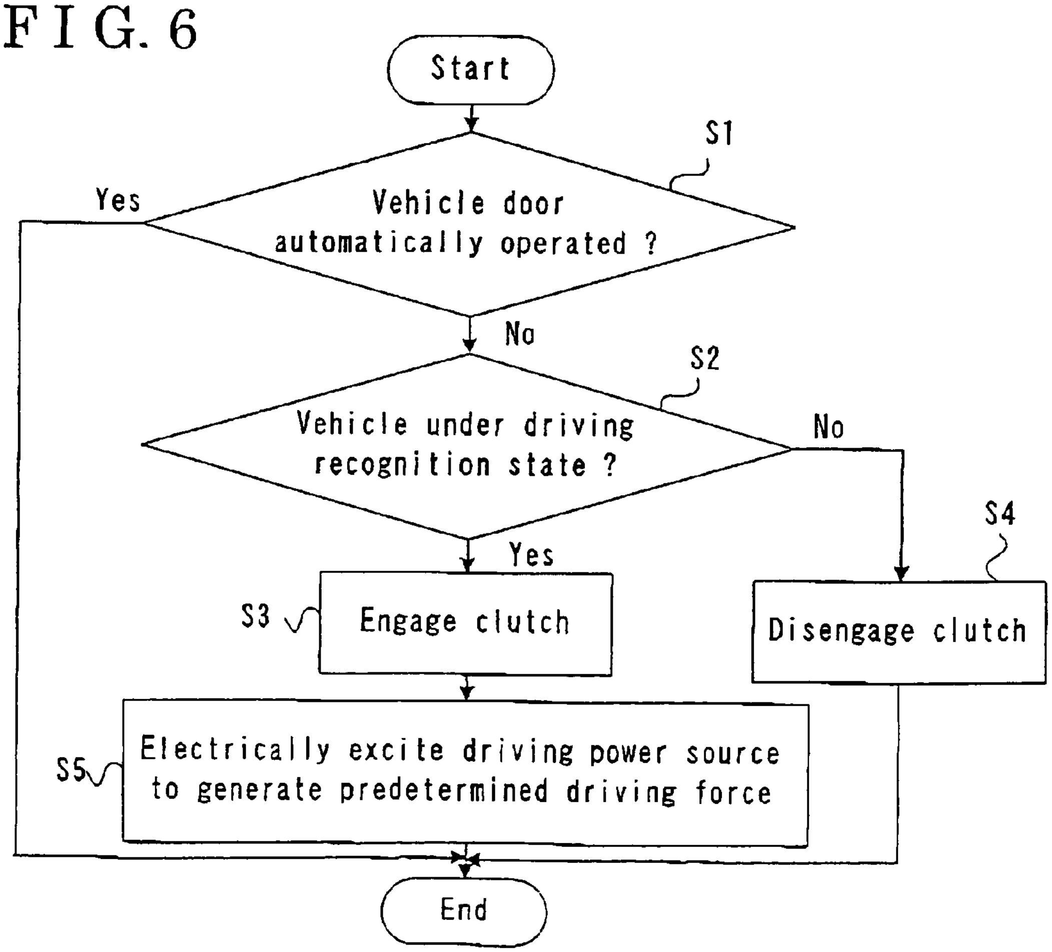
FIG. 6 is another flowchart for explaining the sequence of operating the vehicle door driving system illustrated in FIG. 1.

The program illustrated in FIG. 6 includes steps illustrated in FIG. 5 and additionally includes step S5 after step S3. Namely, at step S5, the controlling means 4 activates the driving power source 1 to generate the predetermined driving force after engaging the clutch 2 at step S3. It is sufficient to generate the predetermined driving force at one time. By generating the predetermined driving force at step S5, the play at the mechanically connected portion between the driving power source 1 and the vehicle door 5 such as a gear backlash, can be reduced or further taken away, thereby enabling to reduce the noise occurred due to the vehicle vibration more effectively.

Figure 2:
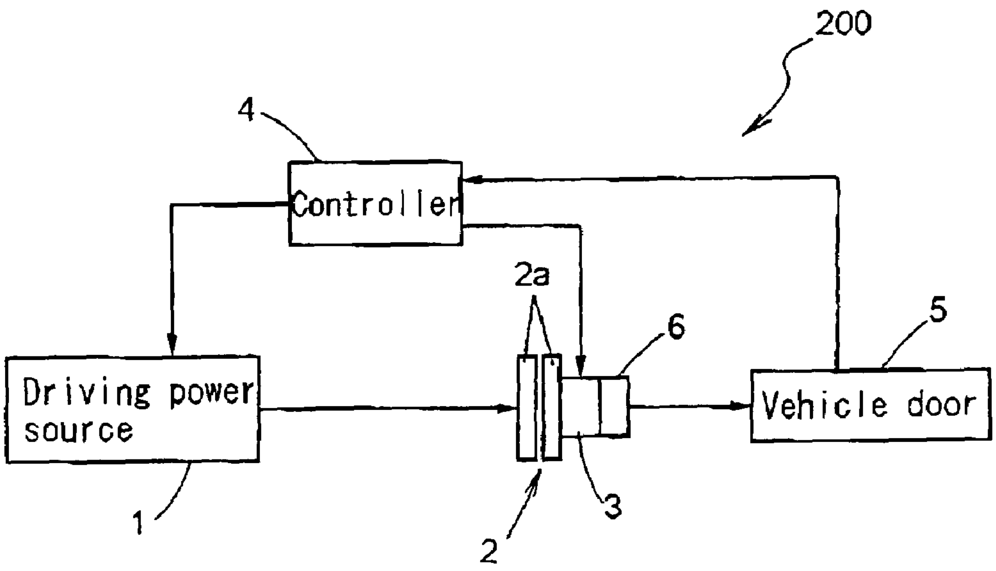
FIG. 2 is a pattern diagram illustrating a vehicle door driving system according to a second embodiment of the present invention.

As illustrated in FIG. 2, a vehicle door driving system 200 according to a second embodiment of the present invention is provided with the driving power source 1, the clutch 2 for transmitting the driving power from the driving power source 1, the switching means 3 for switching the clutch 2 between the clutch engagement condition and the clutch disengagement condition, in the same manner as the vehicle door driving system 100 according to the first embodiment of the present invention.

The vehicle door driving system 200 is further provided with the controlling means for controlling each unit. The controlling means 4 can identify whether the vehicle door 5 is under an open or closed condition. Hereinafter, the vehicle door open state includes a state where the vehicle door 5 is away from the vehicle body at a distance and a state where a vehicle door latch has not been engaged with a striker fixed to a vehicle body even if the vehicle door 5 is not away from the vehicle body. The vehicle door closed state includes a state where the vehicle door 5 has been interacted with the striker fixed to the vehicle body so that the vehicle door 5 cannot to be opened unless the vehicle door 5 is released from the latched condition. It can be identified whether the vehicle door 5 has been under the open or closed condition, based upon a condition of a courtesy switch, a larch switch or a door lock. When a signal, such as a door handle switch signal, an automatic operation start switch signal and so on, is inputted in response to a user's intention to open the door, the vehicle door 5 is about to be released from the latched condition. Therefore, the vehicle door can be judged to be under the door open condition.

Next, following explanation will be given for explaining a relationship between the vehicle door open/closed condition and the vehicle driving recognition state.

When the vehicle door 5 is open, the vehicle is not generally driven with the vehicle door open. Therefore, when the vehicle door 5 is open, the vehicle can be assumed to have been stopped. Namely, when the vehicle door 5 is open, the vehicle is not judged to have been at the vehicle driving recognition state. To the contrary, when the vehicle door 5 is at the closed condition, the vehicle may have moved or stopped. That is, when the vehicle door 5 is at the closed condition, the vehicle may have been actually driven or may have been at the driving recognition state.

The controlling means 4 can control the switching means 3 based upon the open or closed condition of the vehicle door 5. That is, when the controlling means 4 identifies that the vehicle door 5 has been at the closed condition, the controlling means 4 sends a command signal for engaging the clutch 2 to the switching means 3. The switching means 3 receives the command signal and engages the clutch 2. In response to the clutch engagement, noise occurrence can be prevented in the same manner as the first embodiment of the present invention, Further, there is no need to additionally provide a component such as a vibration-absorbing member at the vehicle door driving system 200. Therefore, noise occurrence can be effectively avoided while the manufacturing cost of the system can be prevented from being increased.

The components of the vehicle door driving system 200 according to the second embodiment, which are included in the system 100 in the same manner, can produce the same effects as the first embodiment.

Next, following explanation will be given for explaining a method of operating the vehicle door driving system 200 according to the second embodiment of the present invention with reference to FIGS. 7 and 8. The flowcharts in FIGS. 7 and 8 explain programs for preventing the noise occurrence or for reducing the noise, respectively.

As explained in FIG. 6, the controlling means 4 judges at step S11 whether the vehicle door 5 has been automatically operated. When an affirmative answer YES is obtained at step S11, i.e., when the vehicle door 5 is judged to have been automatically operated, the program is ended without operating the driving power source 1, the clutch 2 and the engagement force adjusting means 6 for the purpose of the noise reduction. On the other hand, when a negative answer NO is obtained at step S11, i.e., when the vehicle door 5 is judged to have not been automatically operated, the program proceeds to step S12, wherein the controlling means 4 judges whether the vehicle door 5 has been at the closed condition. When an affirmative answer YES is obtained at step S12, i.e., when the vehicle door 5 is judged to have been at the closed condition, the program proceeds to step S13. At step S13, the clutch 2 is engaged. The program is then ended. When a negative answer is obtained at step S2, i.e., when the vehicle door 5 is judged to have not been at the closed condition, the program proceeds to step S14, wherein the clutch 2 is disengaged. The program is then ended. The process for engaging the clutch 2 at step S13 can includes a process for adjusting the engagement force for engaging the clutch 2. In this case, heat generation at the clutch 2 due to the electric supply to the clutch 2 can be restrained. Therefore, it is possible to prevent a failure of the vehicle door driving system 200 before happens, thereby enabling to improve durability of the clutch 2.

Figure 7:
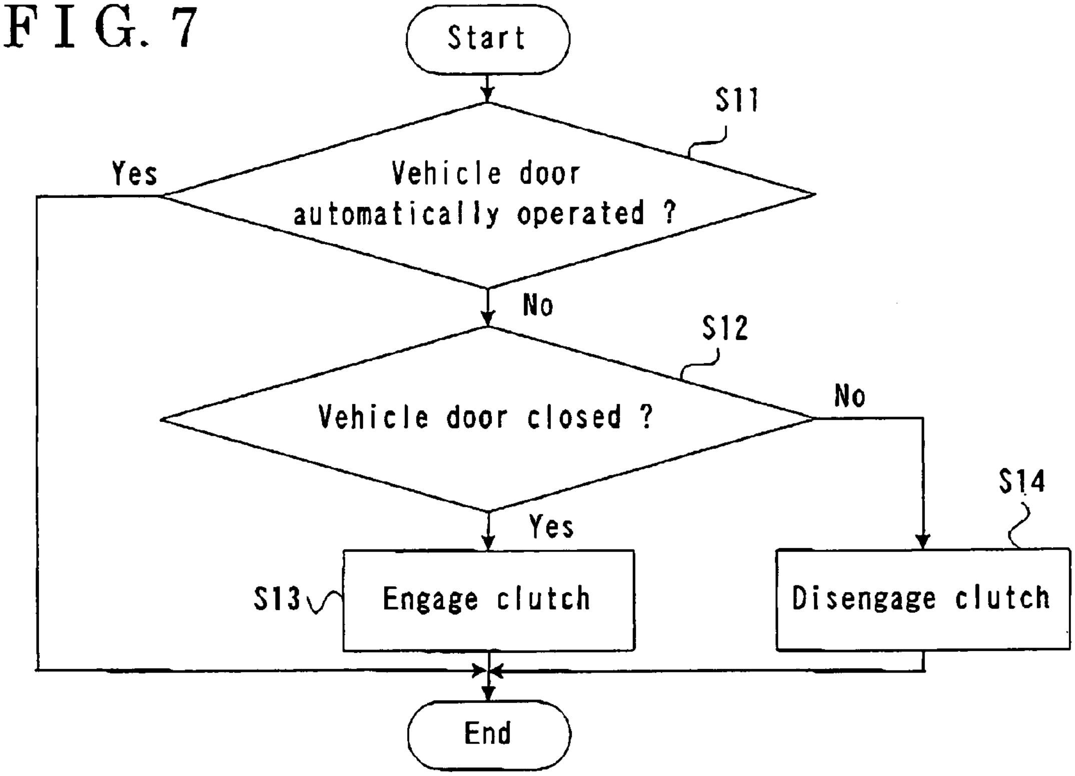
FIG. 7 is a flowchart for explaining a sequence of operating the vehicle door driving system illustrated in FIG. 2.
Figure 8:
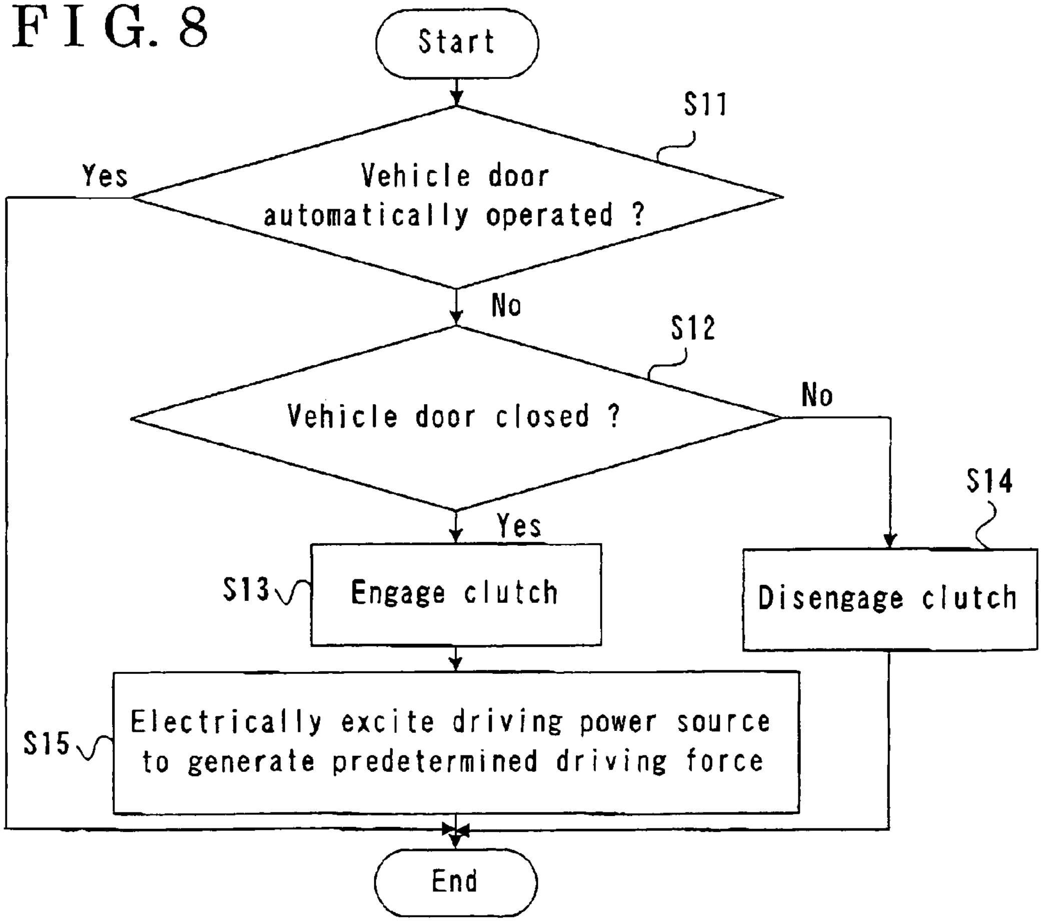
FIG. 8 is another flowchart for explaining the sequence of operating the vehicle door driving system illustrated in FIG. 2.

The program illustrated in FIG. 8 includes steps illustrated in FIG. 7 and additionally includes step S15 after step S13. Namely, at step S15, the controlling means 4 activates the driving power source 1 to generate the predetermined driving force after engaging the clutch 2 at step S13. It is sufficient to generate the predetermined driving force at one time. By generating the predetermined driving force at step S15, the play at the mechanically connected portion between the driving power source 1 and the vehicle door 5 such as a gear backlash, can be reduced or further taken away, thereby enabling to reduce the noise occurred due to the vehicle vibration more effectively.

Next, following explanation will be given for explaining a method of operating the vehicle door driving system 200 according to a modified example of the second embodiment of the present invention with reference to FIGS. 9 and 10. The flowcharts in FIGS. 9 and 10 explain programs for preventing the noise occurrence or for reducing the noise, respectively.

Figure 9:
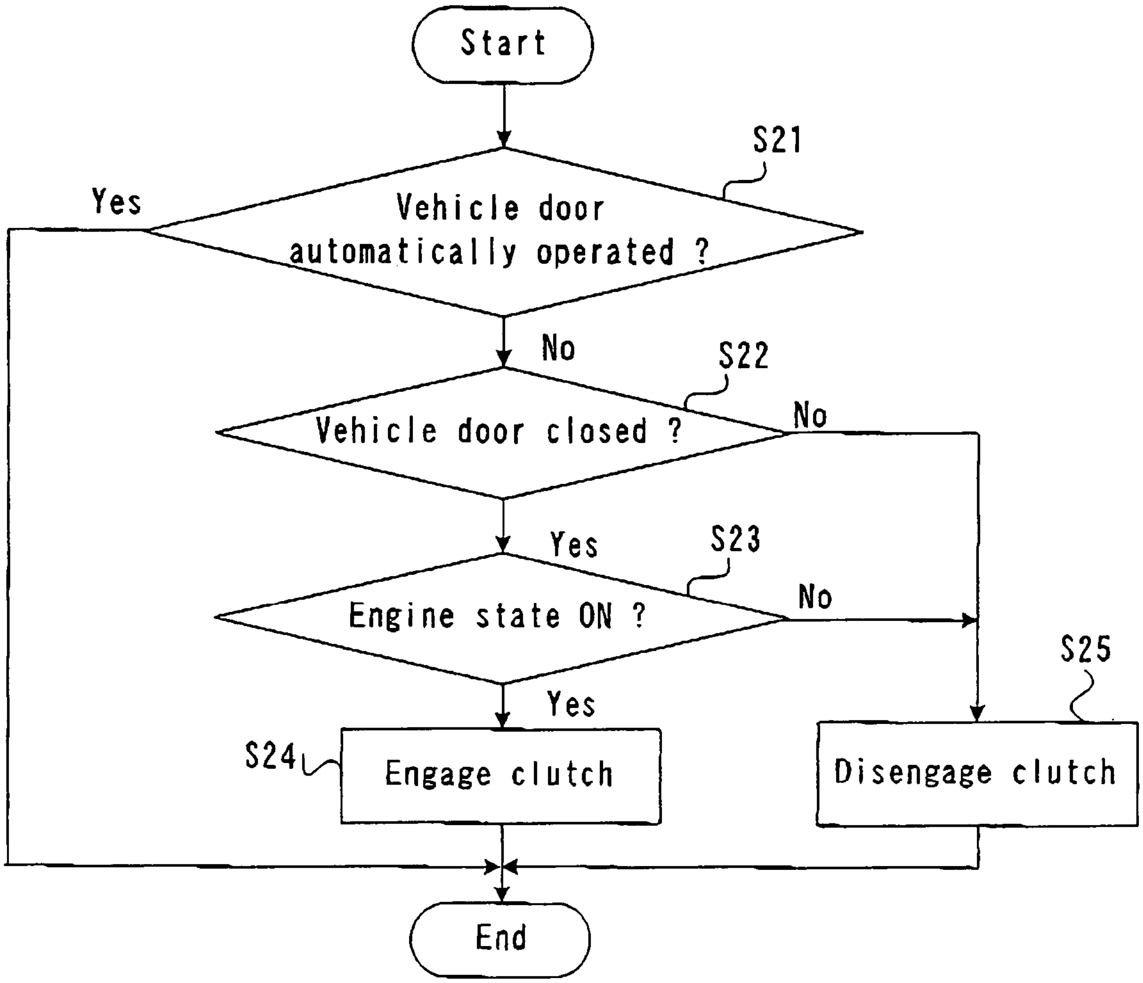
FIG. 9 is a further flowchart for explaining the sequence of operating the vehicle door driving system illustrated in FIG. 2.
Figure 10:
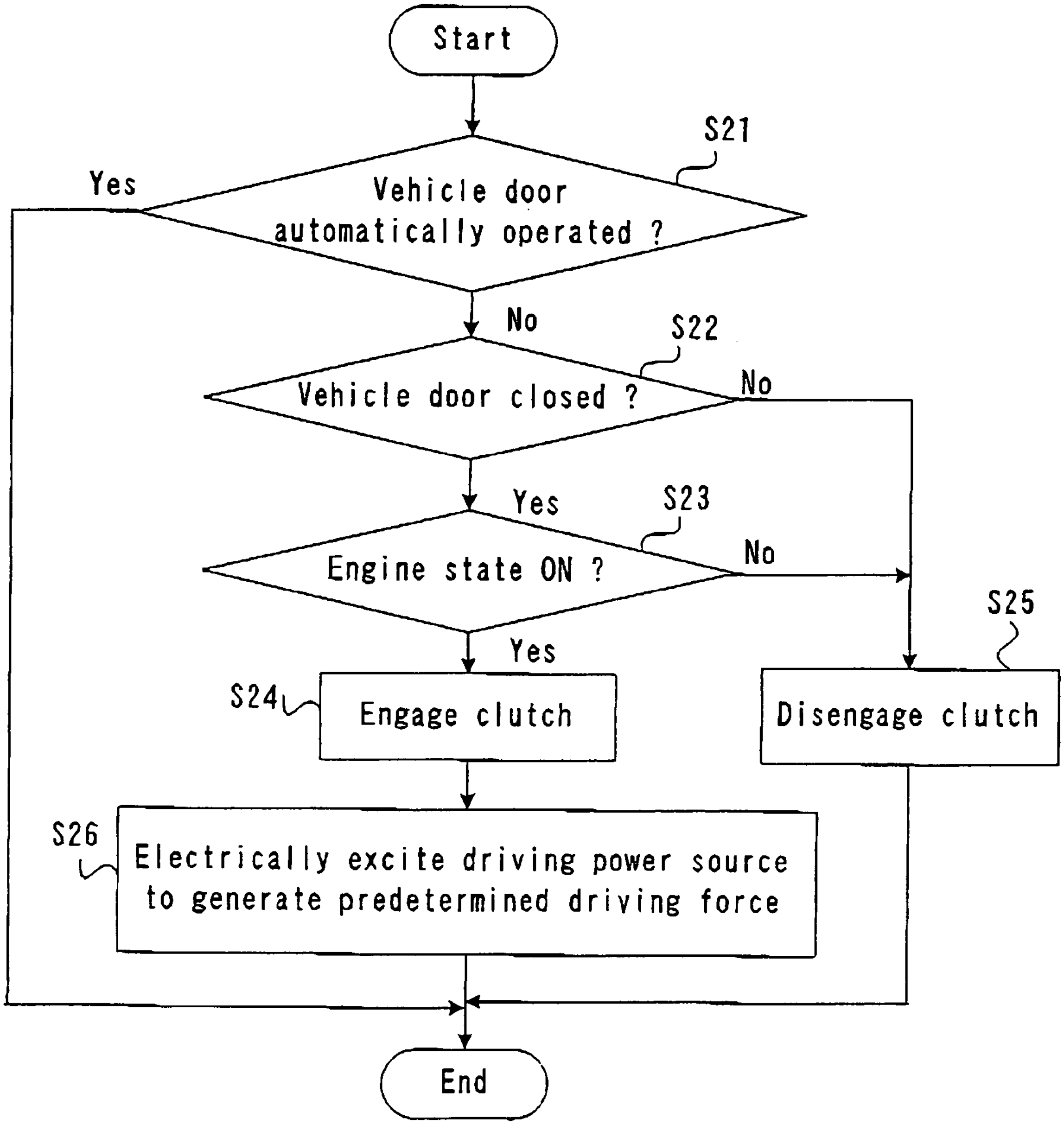
FIG. 10 is a still further flowchart for explaining the sequence of operating the vehicle door driving system illustrated in FIG. 2.

The program illustrated in FIG. 9 includes the steps illustrated in FIG. 7, while the program illustrated in FIG. 10 includes steps illustrated in FIG. 8. The programs illustrated in FIGS. 0 and 10 include step S23, respectively. Namely, at step S23, the controlling moans 4 judges whether the engine has been activated. When an affirmative answer YES is obtained at step S23, i.e., when the engine is judged to have been activated, the clutch 2 is engaged. On the other hand, when a negative answer NO is obtained at step S23, i.e., when the engine is judged to have not been activated, the clutch 2 is disengaged. In more detail, when the engine has not been activated even if the vehicle door 5 has been closed, there is no need to generate the driving force at the driving power source 1. In this case, the program proceeds to step S25 so as to disengage the clutch 2. Therefore, unnecessary electricity consumption can be effectively restrained. Although the engine condition is referred to at step S23, an ignition switch condition can be referred to at step S23.

The principles, the preferred embodiments and mode of operation of the present invention have been described in the foregoing specification. However, the invention which is intended to be protected is not to be construed as limited to the particular embodiment disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A vehicle door driving system comprising:

a driving power source for generating a driving force;

a clutch mechanism configured to transmit the driving force from the driving power source to a vehicle door;

switching means for switching the clutch mechanism between an engagement condition and a disengagement condition; and controlling means for controlling the switching means, wherein the controlling means distinguishes between a state in which a vehicle is being driven and a driving recognition state in which the vehicle is adapted to be driven, and when the controlling means identifies that the vehicle is in the driving recognition state, the controlling means controls the switching means to engage the clutch mechanism.

2. A vehicle door driving system according to claim 1, wherein the controlling means controls the driving power source to generate a predetermined driving force when the clutch mechanism is engaged during the vehicle driving recognition state.

3. A vehicle door driving system according to claim 2, wherein the predetermined driving force is generated in a direction for closing the vehicle door while the clutch mechanism has been engaged during the vehicle driving recognition state.

4. A vehicle door driving system according to claim 2, wherein the controlling means stops the driving power source from generating the predetermined driving force after the predetermined driving force has transmitted to the vehicle door at least one time.

5. A vehicle door driving system according to claim 1, further comprising:

engagement force adjusting means for adjusting an engagement force for engaging the clutch mechanism.

6. A vehicle door driving system according to claim 5, wherein the engagement force adjusting means reduces an amount of electric current to be supplied to the clutch mechanism when the clutch mechanism is engaged.

7. A vehicle door driving system according to claim 5, wherein the engagement force adjusting means performs a pulse width modulation control for reducing the amount of electric current to be supplied to the clutch mechanism.

8. A vehicle door driving system according to claim 5, wherein the engagement force adjusting means identifies the engagement of the clutch mechanism either for operating the vehicle door or for reducing a play at a mechanically connected portion between the driving power source and the vehicle door, wherein the engagement force adjusting means adjusts the engagement force for engaging the clutch mechanism.

9. A vehicle door driving system comprising:

a driving power source for generating a driving force;

a clutch mechanism configured to transmit the driving force from the driving power source to a vehicle door switching means for switching the clutch mechanism between an engagement condition and a disengagement condition; and controlling means for controlling the switching means, wherein the controlling means, distinguishes between a vehicle door open state and a vehicle door closed state, and when the controlling means identifies that the vehicle door is at the closed state, the controlling means controls the switching means to engage the clutch mechanism.

10. A vehicle door driving system according to claim 9, wherein the controlling means controls the driving power source to generate a predetermined driving force when the clutch mechanism is engaged while the vehicle door is at the closed state.

11. A vehicle door driving system according to claim 10, wherein the predetermined driving force is transmitted to the vehicle door in a direction for closing the vehicle door while the clutch mechanism is engaged while the vehicle door is at the closed state.

12. A vehicle door driving system according to claim 10, wherein the controlling means stops the driving power source from generating the predetermined driving force after the predetermined driving force has been transmitted to the vehicle door at least one time.

13. A vehicle door driving system according to claim 9, further comprising:

engagement force adjusting means for adjusting an engagement force for engaging the clutch mechanism.

14. A vehicle door driving system according to claim 13, wherein the engagement force adjusting means reduces an amount of electric current to be supplied to the clutch mechanism when the clutch mechanism is engaged.

15. A vehicle door driving system according to claim 13, wherein the engagement force adjusting means reduces the amount of electric current to be supplied to the clutch mechanism when the clutch mechanism is engaged.

16. A vehicle door driving system according to claim 13, wherein the engagement force adjusting means identifies the engagement of the clutch mechanism either for operating the vehicle door or for reducing a play at a mechanically connected portion between the driving power source and the vehicle door, wherein the engagement force adjusting means adjusts the engagement force for engaging the clutch mechanism.

17. A vehicle door apparatus comprising:

a driving power source;

a clutch mechanism configured to transmit the driving force from the driving power source to a vehicle door;

switching means for switching the clutch mechanism between an engagement condition and a disengagement condition; and a controller for controlling the switching means, wherein the controller controls an opening operation and a closing operation of the vehicle door, and when the controller identifies that the vehicle door is at a closed condition, the controller controls the switching means to engage the clutch mechanism.

* * * * *